United States Patent [19]

Reuter et al.

[11] Patent Number: 5,759,372
[45] Date of Patent: Jun. 2, 1998

[54] ELECTRODEPOSITION COATING MATERIALS AND METHOD OF COATING ELECTRICALLY CONDUCTIVE SUBSTRACTS

[75] Inventors: Hardy Reuter; Günther Ott; Walter Jouck, all of Münser, Germany

[73] Assignee: BASF Lacke + Farben AG, Muenster-Hiltrup, Germany

[21] Appl. No.: 564,326

[22] PCT Filed: Jun. 8, 1994

[86] PCT No.: PCT/EP94/01863

§ 371 Date: Dec. 19, 1995

§ 102(e) Date: Dec. 19, 1995

[87] PCT Pub. No.: WO95/00593

PCT Pub. Date: Jan. 5, 1995

[30] Foreign Application Priority Data

Jun. 22, 1993 [DE] Germany .......................... 43 20 647.6
Jul. 27, 1993 [DE] Germany .......................... 43 25 094.7

[51] Int. Cl.[6] .................. C25D 13/06; C09D 5/44
[52] U.S. Cl. .................. 204/500; 204/501; 204/502; 204/504; 204/505; 204/506
[58] Field of Search .................. 204/499, 500, 204/501, 502, 503, 504, 505, 506; 205/317

[56] References Cited

U.S. PATENT DOCUMENTS

| 4,179,425 | 12/1979 | Pampouchidis et al. | 524/590 |
| 4,732,788 | 3/1988 | Guioth et al. | 204/500 |
| 4,975,475 | 12/1990 | Tsuchiya et al. | 523/411 |
| 5,132,180 | 7/1992 | Kishi et al. | 428/457 |
| 5,171,764 | 12/1992 | Katayama et al. | 523/201 |

FOREIGN PATENT DOCUMENTS

| 0 207 570 A1 | 6/1986 | European Pat. Off. . |
| 0 259 181 A2 | 9/1987 | European Pat. Off. . |
| 0 398 757 A3 | 5/1990 | European Pat. Off. . |
| 0442 533 A1 | 2/1991 | European Pat. Off. . |
| 2 379 587 | 12/1978 | Germany . |

*Primary Examiner*—Kathryn L. Gorgos
*Assistant Examiner*—William T. Leader

[57] ABSTRACT

The invention relates to aqueous electrodeposition coating materials comprising cathodically depositable synthetic resins and further comprising a reaction product (A) and a polymerization initiator (B) which forms free radicals, wherein the cathodically depositable synthetic resin is different from the reaction product (A), and the reaction product (A) is prepared by reacting (a) a polyisocyanate or a mixture of polyisocyanates with (b) an organic compound which contains both at least one ethylenically unsaturated double bond and at least one active hydrogen atom per molecule, or a mixture of such organic compounds, and (c) an organic compound which contains both at least one active hydrogen atom and at least one tertiary amino group and/or at least one ketimine and/or at least one aldimine group per molecule, or a mixture of such organic compounds, and if desired (d) an organic compound which is different from (b) and (c) and contains at least one active hydrogen atom per molecule, or a mixture of such organic compounds.

11 Claims, No Drawings

ELECTRODEPOSITION COATING MATERIALS AND METHOD OF COATING ELECTRICALLY CONDUCTIVE SUBSTRACTS

This is a national stage application of PCT/EP94/01863, filed Jun. 8, 1994.

The invention relates to aqueous electrodeposition coating materials which contain cathodically depositable synthetic resins and to a method of coating electrically conductive substrates, in which (1) the electrically conductive substrate is immersed in an aqueous electrodeposition coating material, (2) the substrate is connected as cathode, (3) a film is deposited on the substrate by means of direct current, (4) the coated substrate is removed from the electrodeposition coating material, and (5) the deposited coating film is baked.

Electrodeposition coating materials containing cathodically depositable synthetic resins, and the above-described cathodic electrodeposition coating method in which the electrodeposition coating materials containing cathodically depositable synthetic resins are used, have been known for a long time and are widely employed for the automatic coating of mass products, in particular for the automatic finishing of vehicle bodies, especially motor vehicle bodies (see in this context, for example, Glasurit Handbuch Lacke und Farbe, Curt R. Vincentz Verlag, Hanover, 1984, pages 374–384 and pages 457–462, and also DE-A-35 18 732, DE-A-35 18 770, EP-A-40 090, EP-A-12 463, EP-A-259 181, EP-A-433 783 and EP-A-262 069).

During the coating of electrically conductive substrates using the cathodic electrodeposition coating method, the problem which occurs is that the edges of the substrate to be coated are only coated with a coating layer of inadequate thickness. One of the consequences of this is that the edges of the coated substrate have an increased susceptibility to corrosion in comparison with the flat areas of the coated substrate. In order to solve this problem it is recommended, in EP-A-259 181, to add to the electrodeposition coating material polymer microparticles which have a softening point which is at least 10° C. above the bath temperature, a solubility parameter which differs by not more than 1.0 from the solubility parameter of the cathodically depositable synthetic resin, a refractive index which differs by 0.02–0.3 from the refractive index of the cathodically depositable synthetic resin or a crosslinking density of 0.01–5.05 mmol/g. According to EP-A-433 783 polymer microparticles of crosslinked urea-aldehyde, triazine-aldehyde or phenol-aldehyde resins or polymer particles of noncrosslinked (meth)acrylonitrile homo- or copolymers should be added to the electrodeposition coating materials.

The addition of the polymer microparticles described in EP-A-259 181 and EP-A-433 783 to electrodeposition coating materials leads in some cases to an improvement in the edge coverage. Despite the improved edge coverage, however, the anticorrosion effect of the deposited electrodeposition coating films at the edge is inadequate. Moreover, the addition of the polymer microparticles described in EP-A-259 181 and EP-A-433 783 has the disadvantageous consequences of reducing the stability of the electrodeposition coating material (occurrence of sedimentation in the electrodeposition coating material), of impairing the adhesion to the substrate and/or to coating layers applied subsequently, of severely impairing the flow and of reducing the anticorrosion effect of the deposited electrodeposition coating films.

The object of the present invention consists in the provision of aqueous electrodeposition coating materials which contain cathodically depositable synthetic resins and give coating films having properties which are improved with respect to the prior art. With the aqueous electrodeposition coating materials, containing cathodically depositable synthetic resins, which are provided it should be possible, in particular, to coat electrically conductive substrates using the cathodic electrodeposition coating method and to obtain coating films which give good coverage of the edges of the coated substrate and which exhibit at least some of the above-described disadvantages of the prior art either not at all or only to a reduced extent.

This object is surprisingly achieved by the provision of aqueous electrodeposition coating materials which contain cathodically depositable synthetic resins, which are characterized in that they contain a reaction product (A) and a polymerization initiator (B) which forms free radicals, the reaction product (A) being preparable by reacting (a) a polyisocyanate or a mixture of polyisocyanates with (b) an organic compound which contains both at least one ethylenically unsaturated double bond and at least one active hydrogen atom per molecule, or a mixture of such organic compounds, and (c) an organic compound which contains both at least one active hydrogen atom and at least one tertiary amino group and/or at least one ketimine and/or at least one aldimine group per molecule, or a mixture of such organic compounds, and if desired (d) an organic compound which is different from (b) and (c) and contains at least one active hydrogen atom per molecule, or a mixture of such organic compounds, in a quantitative ratio such that from 3 to 80 percent of the NCO groups of component (a) are reacted with component (b), from 3 to 80 percent of the NCO groups of component (a) are reacted with component (c) and from 0 to 94 percent of the NCO groups of component (a) are reacted with component (d), and the resulting reaction product is dispersed in water, with at least 5 percent of the tertiary and/or primary amino groups contained in the reaction product being neutralized with a Bronsted acid before, during or after the dispersion.

The electrodeposition coating materials according to the invention may in principle contain, as cathodically depositable synthetic resins, any aqueous cathodically depositable synthetic resin appropriate for aqueous electrodeposition coating materials. The electrodeposition coating materials according to the invention preferably contain cationic, amine-modified epoxy resins as cathodically depositable synthetic resins. Such synthetic resins are known and are described in, for example, DE-A-35 18 770, DE-A-35 18 732, EP-B-102 501, DE-A-27 01 002, U.S. Pat. No. 4,104,147, EP-A-4090, EP-A-12 463, U.S. Pat. No. 4,031,050, U.S. Pat. No. 3,922,253, U.S. Pat. No. 4,101,486, U.S. Pat. No. 4,038,232 and U.S. Pat. No. 4,017,438. These patent documents also describe the preparation of cationic, amine-modified epoxy resins in detail.

Cationic, amine-modified epoxy resins are understood as cationic reaction products of
modified or unmodified polyepoxides and
amines.

These cationic, amine-modified epoxy resins can be prepared by reacting components modified or unmodified polyepoxides and amines followed—if necessary—by protonation. However, it is also possible to react an unmodified polyepoxide with an amine and to carry out further modifications on the resulting amine-modified epoxy resin.

Polyepoxides are understood as compounds containing two or more epoxide groups per molecule.

Particularly preferred polyepoxides are compounds which can be prepared by reacting (i) a diepoxide compound or a mixture of diepoxide compounds having an epoxide equivalent weight of less than 2000 with (ii) a compound which gives a monofunctional reaction with respect to epoxide groups under the given reaction conditions and which contains a phenol or thiol group, or a mixture of such compounds, components (i) and (ii) being employed in a molar ratio of from 10:1 to 1:1, preferably from 4:1 to 1.5:1, and the reaction of component (i) with component (ii) being carried out at from 100° to 190° C., optionally in the presence of a catalyst (cf. DE-A-35 18 770).

Further particularly preferred polyepoxides are compounds which can be prepared by a polyaddition reaction, carried out at from 100° to 195° C. in the presence or absence of a catalyst and initiated by an initiator which gives a monofunctional reaction and carries either an alcoholic OH group, a phenolic OH group or an SH group, of a diepoxide compound and/or a mixture of diepoxide compounds, together if desired with at least one monoepoxide compound, to give an epoxy resin in which the diepoxide compound and initiator are incorporated in a molar ratio of from greater than 2:1 to 10:1 (cf. DE-A-35 18 732).

Polyepoxides which can be employed for the preparation of the particularly preferred components themselves are polyglycidyl ethers of polyphenols, which are prepared from polyphenols and epihalohydrins. Examples of polyphenols which can be employed with very particular preference are bisphenol A and bisphenol F. Also suitable are 4,4'-dihydroxybenzophenone, 1,1-bis(4-hydroxyphenyl)ethane, 1,1-bis(4-hydroxyphenyl)-isobutane, 2,2-bis(4-hydroxy-tert-butylphenyl)propane, bis(2-hydroxynaphthyl)methane, 1,5-dihydroxynaphthalene and phenolic novolak resins.

Other suitable polyepoxides are polyglycidyl ethers of polyhydric alcohols, for example ethylene glycol, diethylene glycol, triethylene glycol, 1,2-propylene glycol, 1,4-propylene glycol, 1,5-pentanediol, 1,2,6-hexanetriol, glycerol and 2,2-bis(4-hydroxycyclohexyl)propane. It is also possible to employ polyglycidyl esters of polycarboxylic acids such as oxalic acid, succinic acid, glutaric acid, terephthalic acid, 2,6-naphthalenedicarboxylic acid and dimerized linoleic acid. Typical examples are glycidyl adipate and glycidyl phthalate.

Also suitable are hydantoine epoxides, epoxidized polybutadiene and polyepoxide compounds obtained by epoxidation of an olefinically unsaturated aliphatic compound.

Modified polyepoxides are understood as polyepoxides in which at least some of the reactive groups have been reacted with a modifying compound.

Examples of modifying compounds are:

compounds containing carboxyl groups, such as saturated or unsaturated monocarboxylic acids (e.g. benzoic acid, linseed oil fatty acid, 2-ethylhexanoic acid, Versatic acid), aliphatic, cycloaliphatic and/or aromatic dicarboxylic acids of various chain lengths (e.g. adipic acid, sebacic acid, isophthalic acid or dimeric fatty acids), hydroxyalkylcarboxylic acids (e.g. lactic acid, dimethylolpropionic acid) and carboxyl group-containing polyesters, or compounds containing amino groups, such as diethylamine or ethylhexylamine, or diamines with secondary amino groups, for example N,N'-dialkylalkylenediamine such as dimethylethylenediamine, N,N'-dialkylpolyoxyalkylene-amines such as N,N'-dimethylpolyoxypropylenediamine, cyanoalkylated alkylenediamines such as N,N'-bis-cyanoethylethylenediamine, cyanoalkylated polyoxyalkyleneamines such as N,N'-bis-cyanoethylpolyoxypropylenediamine, polyaminoamides, for example Versamides, reaction products—containing terminal amino groups in particular—of diamines (e.g. hexamethylenediamine), polycarboxylic acids, especially dimeric fatty acids, and monocarboxylic acids, especially fatty acids, or the reaction product of one mole of diaminohexane with two moles of monoglycidyl ether or monoglycidyl ester, specifically glycidyl esters of α-branched fatty acids such as Versatic acid, or compounds containing hydroxyl groups, such as neopentylglycol, bisethoxylated neopentylglycol, neopentylglycol, hydroxypivalate, dimethylhydantoine-N, N'-diethanol, hexane-1,6-diol, hexane-2,5-diol, 1,4-bis-(hydroxymethyl)cyclohexane, 1,1-isopropylidenebis-(p-phenoxy)-2-propanol, trimethylolpropane, pentaerythritol or amino alcohols such as triethanolamine, methyldiethanolamine or hydroxyl group-containing alkylketimines, such as aminomethylpropane-1,3-diol-methylisobutylketimine or tris(hydroxymethyl)amino-methanecyclohexanoneketimine, and also polyglycol ethers, polyesterpolyols, polyetherpolyols, polycaprolactonepolyols and polycaprolactampolyols of various functionality and molecular weights, or saturated or unsaturated fatty acid methyl esters which are transesterified with hydroxyl groups of the epoxy resins in the presence of sodium methylate.

Primary and/or secondary amines can be employed as the amine.

The amine should preferably be a compound which is soluble in water. Examples of such amines are mono- and dialkylamines such as methylamine, ethylamine, propylamine, butylamine, diemethylamine, diethylamine, dipropylamine, methylbutylamine and the like. Also suitable are alkanolamines, for example methylethanolamine, diethanol-amine and the like. Furthermore, dialkylaminoalkylamines such as dimethylaminoethylamine, diethylaminopropylamine, dimethylaminopropylamine and the like are suitable. It is also possible to employ amines containing ketimine groups, for example the methylisobutyldiketimine of diethylene-triamine. In most cases low molecular weight amines are used, although it is also possible to employ monoamines of higher molecular weight.

In addition, the amines may also contain other groups, although these groups should neither interfere with the reaction of the amine with the epoxide group nor lead to a gelation of the reaction mixture.

Secondary amines are preferably employed as the amine.

The charges necessary for dilutability in water and electrodeposition can be generated by protonation with water-soluble acids (e.g. boric acid, formic acid, lactic acid, preferably acetic acid). Another possibility for introducing cationic groups consists in reacting epoxide groups of the polyepoxide with amine salts.

The cathodically depositable synthetic resins contained in the electrodeposition coating materials according to the invention are generally either auto-crosslinking and/or are combined with a crosslinking agent or with a mixture of crosslinking agents.

Autocrosslinkable synthetic resins can be obtained by introducing into the synthetic resin molecules reactive groups which react with one another under baking conditions. For example, blocked isocyanate groups can be introduced into synthetic resins containing hydroxyl and/or amino groups; under baking conditions these isocyanate groups unblock and react with the hydroxyl and/or amino groups with the formation of crosslinked coating films. Auto-crosslinkable synthetic resins can be obtained, for example, by reacting a synthetic resin containing hydroxyl and/or amino groups with a partially blocked polyisocyanate which contains on average one free NCO group per molecule.

The electrodeposition coating materials according to the invention may in principle contain all crosslinking agents which are suitable for electrodeposition coating materials, examples being phenolic resins, polyfunctional Mannich bases, melamine resins, benzoguanamine resins, blocked polyisocyanates, and compounds containing activated ester groups. The electrodeposition coating materials according to the invention preferably contain blocked polyisocyanates as crosslinking agent. The use of blocked polyisocyanates in electrodeposition coating materials containing cathodically depositable synthetic resins has been known for a long time and is also described in detail, inter alia, in the patent documents cited above. Appropriate blocked polyisocyanates can be prepared by, for example, reacting component (a) described below with component (d) described below to give a product which is free from NCO groups.

It is essential to the invention that the electrodeposition coating materials according to the invention contain a reaction product (A) and a polymerization initiator (B) which forms free radicals, the reaction product (A) being preparable by reacting (a) a polyisocyanate or a mixture of polyisocyanates with (b) an organic compound which contains both at least one ethylenically unsaturated double bond and at least one active hydrogen atom per molecule, or a mixture of such organic compounds, and (c) an organic compound which contains both at least one active hydrogen atom and at least one tertiary amino group and/or at least one ketimine and/or at least one aldimine group per molecule, or a mixture of such organic compounds, and if desired (d) an organic compound which is different from (b) and (c) and contains at least one active hydrogen atom per molecule, or a mixture of such organic compounds, in a quantitative ratio such that from 3 to 80 percent, preferably from 5 to 40 percent, of the NCO groups of component (a) are reacted with component (b), from 3 to 80 percent, preferably from 3 to 15 percent of the NCO groups of component (a) are reacted with component (c) and from 0 to 94 percent, preferably from 45 to 92 percent of the NCO groups of component (a) are reacted with component (d), and the resulting reaction product is dispersed in water, with at least 5 percent, preferably at least 10 percent, of the tertiary and/or primary amino groups contained in the reaction product being neutralized with a Brönsted acid before, during or after the dispersion.

The reaction of components (a), (b), (c) and if appropriate (d) can be carried out either in bulk or in organic solvents, for example hydrocarbons such as toluene or xylene, ketones, such as methyl ethyl ketone or methyl isobutyl ketone, or ethers such as dioxane and ethylene glycol dibutyl ether. The reaction is preferably carried out in organic solvents. The reaction temperature is conventionally from 30° to 150° C., preferably from 40° to 100° C. The reaction can also be catalyzed. Examples of suitable catalysts are organotin compounds, such as dibutyltin dilaurate and dibutyltin oxide. The reaction is preferably carried out in the presence of a polymerization inhibitor such as, for example, di-tert-butylcresol, pentaerythrityl tetrakis[3-(3,5-di-tert-butyl-4-hydroxy-phenyl)propionate] (Irganox 1010 from Ciba Geigy) or p-benzoquinone.

The selection of the quantitative ratio in which components (a), (b), (c) and if appropriate (d) are to be reacted with one another, such that from 3 to 80 percent, preferably from 5 to 40 percent, of the NCO groups of component (a) are reacted with component (b), from 3 to 80 percent, preferably from 3 to 15 percent, of the NCO groups of component (a) are reacted with component (c) and from 0 to 94 percent, preferably from 45 to 92 percent, of the NCO groups of component (a) are reacted with component (d), is easily possible for the person skilled in the art by means of stoichiometric calculations. In some cases it may be advantageous to prepare the reaction product (A) by the reaction in stages of component (a), (b), (c) and if appropriate (d).

Following reaction of components (a), (b), (c) and if appropriate (d) the reaction product obtained is dispersed in water. To obtain a stable aqueous dispersion a Brönsted acid or a mixture of Brönsted acids is added to the reaction product before, during or after the dispersion in a quantity such that at least 5 percent, preferably at least 10 percent, of the tertiary and/or primary amino groups present in the reaction product are neutralized with a Brönsted acid. The primary amino groups are formed by hydrolysis of the ketimine and/or aldimine groups. Examples of Brönsted acids which can be employed are acetic acid, lactic acid, oxalic acid, tartaric acid or mixtures of these Brönsted acids.

The reaction product (A) employed in accordance with the invention contains in general from 0.1 to 2.3 mmol/g, prefererably from 0.2 to 0.8 mmol/g (based on solids) of cationic groups in the form of protonated tertiary and/or primary amino groups.

As component (a) it is in principle possible to employ any organic compound which contains on average at least 1.1 NCO groups per molecule, or a mixture of such organic compounds. As component (a) it is preferred to employ a polyisocyanate which contains on average from 1.1 to 3.0 NCO groups per molecule, or a mixture of such polyisocyanates. It is possible to employ as component (a) aliphatic, cycloaliphatic or aromatic polyisocyanates, addition products prepared from these polyisocyanates and containing cyanurate and/or biuret groups, and NCO group-containing prepolymers prepared from these polyisocyanates and from low or higher molecular weight compounds containing hydroxyl and/or amino groups (for example trimethylolpropane, polyesterpolyols and polyetherpolyols). Examples of polyisocyanates which can be employed are: 2,4- and 2,6-tolylene diisocyanate, isophorone diisocyanate, hexamethylene diisocyanate, and 4,4'- and 2,4'-diphenylmethane diisocyanate. It is also possible to employ carbodiimide and/or uretoneimine group-containing polyisocyanates as component (a).

As component (b) it is possible in principle to employ any organic compound which contains both at least one ethylenically unsaturated double bond and at least one active hydrogen atom per molecule, or a mixture of such organic compounds. Active hydrogen atoms are understood as hydrogen atoms which can react with NCO groups. As component (b) it is possible to employ, for example, an organic compound which contains both one ethylenically unsaturated double bond and one hydroxyl, amino or mercapto group per molecule.

It is preferred to employ as component (b) a derivative of acrylic acid or methacrylic acid containing a hydroxyl or a mercapto group, preferably a hydroxyl group, or a mixture of such derivatives of acrylic acid or methacrylic acid. Examples of acrylic or methacrylic acid derivatives which can be employed are: 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, 4-hydroxybutyl methacrylate and ethoxylated or propoxylated derivates thereof which contain 1–50, preferably 1–8 and particularly preferably 1–3 alkylene oxide units. As component (b) it is very particularly preferred to employ a hydroxyalkyl ester of acrylic acid or methacrylic acid, or a mixture of hydroxyalkyl esters of acrylic acid or methacrylic acid. The hydroxyalkyl esters generally have from 1 to 6 and preferably from 2 to 4 carbon atoms in the alcohol residue. Examples of hydroxyalkyl esters which it is very particularly preferred to employ are: 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate and 4-hydroxybutyl methacrylate.

As component (c) it is possible in principle to employ any organic compound which contains both at least one active hydrogen and at least one tertiary amino group and/or at least one ketimine and/or at least one aldimine group per molecule, or a mixture of such organic compounds. Active hydrogen atoms are understood as hydrogen atoms which react with NCO groups. The compounds containing ketimine or aldimine groups can be obtained by reacting compounds which contain both a hydrogen atom which is active with respect to NCO groups and contain at least one primary amino group per molecule, with a ketone, for example acetone, methyl ethyl ketone or methyl isobutyl ketone, or an aldehyde, preferably in an organic solvent, for example xylene, toluene or n-hexane. The reaction is conventionally carried out at elevated temperatures, the water of reaction being removed by azeotropic distillation.

As component (c) it is possible to employ, for example, an organic compound which contains both a hydroxyl, an amino or a mercapto group and at least one tertiary amino group and/or at least one ketimine and/or at least one aldimine group per molecule. Preferred among these compounds are those containing both a hydroxyl, a primary amino or a secondary amino group and one tertiary amino group or one ketimine group per molecule. Examples of such compounds are: N,N-dimethylethanolamine, N,N-diethylethanolamine, N,N-butylethylpropanolamine, N,N-dimethylaminoethylamine, N,N-diethylaminoethylamine, N,N-dimethylaminopropylamine, N,N-diethylaminopropylamine, N,N-dimethylaminoethyl mercaptan, N,N-diethylaminoethyl mercaptan and reaction products of acetone, methyl ethyl ketone, methyl isobutyl ketone, dihydroisophorone or isophorone with β-aminoethanol, a β-amino mercaptan, 2,2'-aminoethoxyethanol [sic], N-amino-ethylpiperazine, diethylenetriamine, dipropylenetriamine and dibutylenetri-amine.

It is particularly preferred to employ as component (c) compounds of the general formula A—R³—X (I), in which A represents a group of the general formula R¹R²N— or R¹R²C=N—, R³ represents an alkylene radical having from 1 to 20 carbon atoms, preferably from 2 to 6 carbon atoms and particularly preferably from 2 to 4 carbon atoms, or represents a group of the general formula —R⁴—O—R⁵— and X represents a hydroxyl group, a primary amino group or a group of the general formula —NH—R⁶, where R¹ and R² may be identical or different and each represent a hydrocarbon radical having from 1 to 20 carbon atoms, preferably from 1 to 6 carbon atoms, and particularly preferably each represent an alkyl radical having from 1 to 6 carbon atoms, preferably from 1 to 4 carbon atoms, R⁴ and R⁵ may be identical or different and each represent an alkylene radical having from 1 to 12 carbon atoms, preferably from 1 to 6 carbon atoms and particularly preferably from 1 to 4 carbon atoms, and R⁶ represents a hydrocarbon radical having from 1 to 20 carbon atoms, preferably from 1 to 6 carbon atoms, and particularly preferably represents an alkyl radical having from 1 to 6 carbon atoms, preferably from 1 to 4 carbon atoms, or represents a group of the general formula —R³—A, where A and R³ have the definition outlined above. Examples of compounds of the general formula (I) are: N,N-dimethylethanolamine, N,N-diethylethanolamine, N,N-dimethylpropanolamine, N,N-diethylpropanolamine, N,N-butyl-ethylpropanolamine, N,N-dimethylaminoethylamine, N,N-dimethylaminopropylamine, N,N-diethylaminoethylamine, N,N-diethylaminopropylamine, and reaction products of acetone, methyl ethyl ketone, methyl isobutyl ketone, dihydro-isophorone or isophorone with β-aminoethanol, 2,2'-amino-ethoxyethanol, N-aminoethylpiperazine, diethylenetri-amine and dipropylenetriamine.

As component (d) it is possible in principle to employ any organic compound which is different from (b) and (c) and contains at least one active hydrogen atom per molecule, or a mixture of such organic compounds. As component (d) it is preferred to employ well-known blocking agents for polyisocyanates. Examples are: aliphatic monoethers of alkanediols such as ethyl-, propyl- and butylglycol; aliphatic monoalcohols having from 1 to 4 carbon atoms per molecule, such as methanol, ethanol, propanol and butanol; cycloaliphatic monoalcohols such as cyclohexanol; aromatic alkyl alcohols such as phenylcarbinol; phenol compounds, such as phenol itself and substituted phenols such as cresol, nitrophenol, chlorophenol and ethylphenol; amines, such as di-n-butylamine, di-sec-butylamine, dicyclo-hexylamine, piperidine, 2-methylpiperidine and 2,6-dimethylpiperidine; oximes, such as acetone oxime, butanone oxime, diethyl ketoxime, methyl ethyl ketoxime, methyl isobutyl ketoxime, diisopropyl ketoxime, cyclohexanone oxime, 2-methylcyclohexanone oxime, 2,6-dimethylcyclohexanone oxime and acetophenone oxime; lactams, such as ε-caprolactam, and CH-acidic compounds such as dialkyl malonates, alkyl acetoacetates and acetylacetone; and heterocyclic compounds such as furfuryl alcohol, etc. As component (d) it is also possible to employ polyols, preferably aliphatic polyols containing from 2 to 20 carbon atoms, preferably from 2 to 10 carbon atoms and from 2 to 5, preferably from 2 to 3 hydroxyl groups per molecule, for example ethylene glycol, propanediol, butanediol, hexanediol, glycerol, and trimethylolpropane. It is also possible to employ as component (d) hydroxyl group-containing polyethylene oxides, polypropylene oxides, polytetramethylene oxides and copolymers thereof.

It is furthermore essential to the invention that the electrodeposition coating materials according to the invention also contain, in addition to the reaction product (A), a polymerization initiator (B) which forms free radicals. It is preferred to employ as component (B) polymerization initiators which form free radicals at temperatures from 50° C. upwards.

Examples of component (B) which can be employed are azo compounds, for example azobisisobutyronitrile or azobisisovaleronitrile, or peroxide compounds, for example dilauroyl peroxide, diacetyl peroxydicarbonate, tert-butyl peroxydiethylacetate and dibenzoyl peroxide.

The electrodeposition coating materials according to the invention may also contain, in addition to components (A) and (B), compounds (C) which are able to scavenge free radicals. Examples of such compounds are: hydroquinone, hydroquinone monomethyl ether, p-benzoquinone, di-tert-butylcresol and pentaerythrityl tetrakis[3-(3,5-di-tert-butyl-4-hydroxyphenyl)propionate].

The aqueous electrodeposition coating materials according to the invention may also contain, in addition to the components described above, other conventional coating components, for example organic solvents, pigments, fillers, wetting agents, anticrater additives etc.

The solids content of the electrodeposition coating materials according to the invention is in general from 5 to 40 percent by weight, preferably from 10 to 40 percent by weight and particularly preferably from 20 to 40 percent by weight.

The nonvolatile content of the electrodeposition coating materials according to the invention consists to the extent of from 35 to 70% by weight, preferably from 35 to 65% by weight, of a cathodically depositable synthetic resin or a mixture of cathodically depositable synthetic resins, to the extent of from 0 to 45% by weight, preferably from 10 to 35% by weight, of a crosslinking agent which is different from component (A) or a mixture of crosslinking agents which are different from component (A), to the extent of from 5 to 45% by weight, preferably from 10 to 20% by weight, of component (A), to the extent of from 0.015 to 1.35% by weight, preferably from 0.015 to 0.45% by weight, of component (B), to the extent of from 0 to 0.3% by weight, preferably from 0.0015 to 0.15% by weight, of component (C) and to the extent of from 5 to 35% by weight, preferably from 15 to 35% by weight, of pigments and/or fillers.

The electrodeposition coating materials according to the invention are employed for the coating of electrically conductive substrates, in which (1) the electrically conductive substrate is immersed in an aqueous electrodeposition coating material, (2) the substrate is connected as cathode, (3) a film is deposited on the substrate by means of direct current, (4) the coated substrate is removed from the electrodeposition coating material, and (5) the deposited coating film is baked.

The method described above is known and has been employed widely for many years now (see also the above-cited patent documents). The voltage applied may vary within a wide range and may be, for example, between 2 and 1000 V. The method is typically operated, however, at voltages of between 50 and 500 V. The current density is generally between about 10 and 100 A/m². In the course of the deposition, the current density tends to fall. As soon as the coating film has been deposited on the substrate, the coated substrate is removed from the electrodeposition coating material and rinsed. Subsequently the deposited coating film is baked. The baking temperatures are conventionally from 130° to 200° C., preferably from 150° to 180° C., and the baking time is in general between 10 and 60 min, preferably between 15 and 30 min.

Using the method described above, it is possible in principle to coat all electrically conductive substrates.

Examples of electrically conductive substrates are substrates of metal, such as steel, aluminum, copper and the like.

The invention is illustrated in more detail in the following examples. All parts and percentages are by weight unless expressly stated otherwise.

1. Preparation of Crosslinking Agents 1.1 Crosslinking agent I

In a reactor fitted with a stirrer, reflux condenser, internal thermometer and inert gas inlet, 1046 g of isomers and more highly functional oligomers based on 4,4'-diphenylmethane diisocyanate having an NCO equivalent weight of 135 (Lupranat® M20S, BASF; NCO functionality about 2.7; content of 2,2'- and 2,4'-diphenylmethane diisocyanate less than 5%) are placed under a nitrogen atmosphere. 2 g of dibutyltin dilaurate are added, and 963 g of butyldiglycol are added dropwise at a rate such that the product temperature remains below 60° C. Cooling must be carried out if appropriate. After the end of the addition, the temperature is maintained at 60° C. for a further 60 min and an NCO equivalent weight of 1120 (based on solid components) is determined. After dissolution in 774 g of methyl isobutyl ketone and addition of 3 g of dibutyltin dilaurate, 87 g of melted trimethylolpropane are added at a rate such that the product temperature does not exceed 100° C. After the end of the addition, the mixture is allowed to react for a further 60 min. In the subsequent check no further NCO groups can be detected. The batch is cooled to 65° C. and diluted simultaneously with 96 g of sec-butanol and 30 g of methyl isobutyl ketone. The solids content is 70.1% (1 h at 130° C.).

1.2 Crosslinking agent II

In a reactor as described in the preceding example, 1464 g of trimerized hexamethylenediisocyanate having an NCOruction ent weight of 191 ("Basonat® PLR 8638", BASF) and 510 g of methyl isobutyl ketone are heated to 50° C. with stirring under a nitrogen atmosphere. 936 g of di-n-butylamine are then added dropwise over 4 h. The temperature is maintained at below 55° C. by cooling during this addition. The solution of crosslinking agent is then cooled and diluted with 90 g of n-butanol. During the subsequent check no NCO groups can be detected. The solids content is 79.8% (measured for 1 h at 130° C.).

2. Preparation of an Aqueous Dispersion Containing a Cathodically Depositable Synthetic Resin and a Mixture of Crosslinking Agents In a reactor, 1228 parts of epoxy resin based on bisphenol A having an epoxy equivalent weight (EEW) of 188 are heated to 105° C. under a nitrogen atmosphere together with 279 parts of bisphenol A, 268 parts of dodecylphenol and 89 parts of xylene. Using a water separator, traces of water are removed in vacuo for 20 min by azeotropic distillation under reflux. The mixture is then heated to 130° C. and 5 parts of N,N-dimethylbenzylamine are added. The reaction mixture is maintained at this temperature until the EEW has reached a value of 870. 39 parts of butylglycol, 204 parts of sec-butanol and—after cooling to below 115° C.—139 parts of diethanolamine are added, and cooling is continued to 90° C. One hour after addition of the amine, 192 parts of Plastilit 3060 (propylene glycol compound, BASF) are added and the batch is diluted with 144 parts of sec-butanol and 55 parts of propylene glycol phenyl ether and at the same time is cooled rapidly to 65° C. Subsequently, 39 parts of N,N-dimethylaminopropylamine are added, the temperature is maintained for half an hour, and is then raised to 90° C. This temperature is maintained for 1.5 hours. The mixture is then cooled to 70° C. 743 parts of crosslinking agent I (section 1.1) and 650 parts of crosslinking agent II (section 1.2) are added to the reaction mixture, and the batch is homogenized for 10 min and transferred to a dispersion vessel. In this vessel it is admixed, with stirring and in portions, with 107 parts of lactic acid (88% strength in water) in 2203 parts of deionized water. The mixture is then homogenized for 20 min before further dilution is carried out using a further 3593 parts of deionized water, in small portions.

By distillation in vacuo the volatile solvents are removed and are then replaced with an equal volume of deionized water. The dispersion possesses the following characteristics:

Solids content: 32% (1 hour at 130° C.)

Base content: 0.66 milliequivalent/g of solids

Acid content: 0.25 milliequivalent/g of solids pH: 6.1

3. Preparation of a Gray Pigment Paste 2781 parts of bisphenol A diglycidyl ether, 144 parts of xylene and 581 parts of bisphenol A are reacted at 150°–160° C. in the presence of 0.2 part of triphenylphosphine, up to an EEW of 345. The batch is then diluted with 2161 parts of butylglycol and cooled to 49° C. A mixture of 777 parts of 9-amino-3,6-dioxanonan-1-ol and 407 parts of N,N-dimethyl-aminopropylamine is then added over the course of 6 min, the temperature rising to 110° C. The mixture is maintained at between 110° and 115° C. for one hour, before 645 parts of butylglycol are added and the batch is cooled to 77° C. Subsequently, 149 parts of nonylphenol glycidyl ether are added. The temperature then rises to 90° C. and is maintained at this point for one hour, before the batch is diluted with 1003 parts of butylglycol and cooled. The solids content of the highly mobile resin solution is 60%.

For the preparation of the pigment paste, first of all 280 parts of water and 250 parts of the above-described resin solution are premixed. Then 5 parts of carbon black, 35 parts of basic lead pigment, 90 parts of Extender HEWP[1]), 315 parts of titanium dioxide (R 900), 5 parts of Bentone EW[2]) and 20 parts of dibutyltin oxide are added. The mixture is predispersed for 30 min in a high-speed dissolver/stirrer apparatus. Subsequently the mixture is dispersed in a small laboratory mill (Motor Mini Mill, Eiger Engineering Ltd., Great Britain) for from 1 to 1.5 h to a Hegmann fineness of less than or equal to 12, and adjusted to processing viscosity with additional water.

1) English China Clay Int., Great Britain
2) Rheox, Germany

A pigment paste is obtained which is stable to separation.

4. Preparation of Aqueous Dispersions Containing the Reaction Product (A) and a Polymerization Initiator (B) Which Forms Free Radicals 4.1 Preparation of dispersion I 1021 g of tolylene diisocyanate (mixture of approximately 80% by weight of the 2,4- and 20% by weight of the 2,6-isomer) and 180 g of methyl isobutyl ketone are placed under a nitrogen atmosphere in a reactor fitted with a stirrer, reflux condenser, internal thermometer and inert gas line. 0.4 g of dibutyltin dilaurate is added and, over the course of one hour, a solution is introduced of 254 g of trimethylolpropane in 254 g of methyl isobutyl ketone, which solution is equilibrated at 70° C. Cooling is regulated so that the temperature does not exceed 60° C. 30 min after the end of addition, an NCO equivalent weight of 217 is measured, based on solids. With further cooling, 102 g of n-propylglycol are added dropwise over the course of 20 min, the increase in temperature being limited to 55° C. The reaction mixture is subsequently cooled to 40° C. 564 g of hydroxypropyl methacrylate, in which 0.4 g of di-tert-butyl-p-cresol had been dissolved beforehand, are added dropwise to the contents of the reactor. The rate of addition is controlled such that the temperature of the reaction mixture does not exceed 50° C. After the end of addition (after about one hour) the batch is maintained at 50° C. and an NCO equivalent weight of 1670 is determined, based on solids content. After simultaneous addition of 433 g of methyl isobutyl ketone and cooling to 35° C., 115 g of N,N-diethylethanolamine in one portion are added to the reaction mixture. After 30 min, a further 0.6 g of di-tert-butyl-p-cresol in 20 g of sec-butanol is added. As soon as no further NCO groups can be detected, 16 g of azobisisovaleronitrile dissolved beforehand in 39 g of methyl isobutyl ketone are added to the reaction mixture. 1309 parts of the resulting organic solution are admixed in a dispersion vessel with 492 parts of deionized water containing 35 parts of lactic acid (88% strength in water). Homogenization is then carried out for 20 min and the mixture is diluted further with stirring using a further 995 parts of deionized water. The resulting dispersion has a solids content of 32.2% (1 h, 130° C.).

4.2 Dispersion II 4.2.1 Preparation of an organic compound which contains both one active hydrogen atom and one ketimine group per molecule 1100 g of 2,2'-aminoethoxyethanol ($H_2N-CH_2CH_2-O-CH_2CH_2-OH$) and 1886 g of methyl isobutyl ketone are placed in a reactor fitted with stirrer, inert gas line, water separator and reflux condenser and heated slowly with stirring in a nitrogen atmosphere. Water of condensation is separated off from 109° C. The temperature is increased in small steps over the course of 3 h up to 142° C., and this temperature is maintained until 189 g of water have been removed. The mixture is subsequently cooled to 40° C. and discharged under nitrogen.

The cooled solution has an amine equivalent weight of 265.

4.2.2 Preparation of dispersion II 992 g of tolylene diisocyanate (mixture of approximately 80% by weight of the 2,4- and 20% by weight of the 2,6-isomer) and 175 g of methyl isobutyl ketone are placed under a nitrogen atmosphere in a reactor fitted with a stirrer, reflux condenser, internal thermometer and inert gas line. 0.4 g of dibutyltin dilaurate is added and, over the course of one hour, a solution is introduced of 247 g of trimethylolpropane in 247 g of methyl isobutyl ketone, which solution is equilibrated at 70° C. Cooling is regulated so that the temperature does not exceed 60° C.

30 min after the end of addition, an NCO equivalent weight of 208 is measured (based on solids). With further cooling, 119 g of n-propylglycol are added dropwise over the course of 20 min, the increase in temperature being limited to 55° C. The reaction mixture is subsequently cooled to 40° C. 548 g of hydroxypropyl [sic] methacrylate, in which 0.4 g of di-tert-butyl-p-cresol had been dissolved beforehand, are added dropwise to the contents of the reactor. The rate of addition is controlled such that the temperature of the reaction mixture does not exceed 50° C. After the end of addition (after about 1 hour) the batch is maintained at 50° C. and an NCO equivalent weight of 2015 is determined, based on solids content. After simultaneous addition of 420 g of methyl isobutyl ketone and cooling to 35° C., 178 g of the reaction product of 2,2'-aminoethoxyethanol [sic] and methyl isobutyl ketone described in section 4.2.1 are added in one portion to the reaction mixture. After 30 min, a further 0.6 g of di-tert-butyl-p-cresol in 19 g of sec-butanol is added. As soon as no further NCO groups can be detected, 16 g of azobisisobutyronitrile dissolved beforehand in 38 g of methyl isobutyl ketone are added to the reaction mixture. 2142 parts of the resulting organic solution are admixed in a dispersion vessel with 1718 parts of deionized water containing 57 parts of lactic acid (88% strength in water). Subsequently, 25 parts of butylglycol are added and homogenization is then carried out for 20 min. The mixture is diluted further with stirring using a further 3488 parts of deionized water. The resulting dispersion has a solids content of 20.4% (1 h, 130° C.).

5. Preparation and Deposition of Electrodeposition Coating Materials According to the Invention

5.1 Electrodeposition paint (I)

2078 parts of the dispersion of section 2. and 516 parts of the dispersion of section 4.1 are mixed and are diluted with 1500 parts of deionized water and 25 parts of a 10% strength aqueous solution of lactic acid. 646 parts of the pigment paste of section 3. are added with stirring to the resulting mixture. The electrodeposition paint thus obtained is made up to 5000 parts with deionized water. After aging for 5 days at room temperature, the paint is deposited on a steel test panel connected as cathode. The deposition voltage here is 300 V and the deposition time 2 min and the bath temperature is adjusted to 30° C. The deposited paint film is rinsed with deionized water and baked at 165° C. for 20 min. The baked paint films thus obtained were tested. The test results can be taken from Table 1.

5.2 Electrodeposition paint (II)

2078 parts of the dispersion of section 2. and 815 parts of the dispersion of section 4.2 are mixed and are diluted with 1300 parts of deionized water and 25 parts of a 10% strength aqueous solution of lactic acid. 646 parts of the pigment paste of section 3. are added with stirring to the resulting mixture. The electrodeposition paint thus obtained is made up to 5000 parts with deionized water. After aging for 5 days at room temperature, the paint is deposited on a steel test panel connected as cathode. The deposition voltage here is 300 V and the deposition time 2 min, and the bath temperature is adjusted to 30° C. The deposited paint film is rinsed with deionized water and baked at 165° C. for 20 min. The baked paint films thus obtained were tested. The test results can be taken from Table 1.

6. Preparation and Deposition of an Electrodeposition Coating Material of the Prior Art (Electrodeposition Paint (III); Comparison Example)

2598 parts of the dispersion of section 2. are diluted with 1500 parts of deionized water and 25 parts of a 10% strength aqueous solution of lactic acid. 646 parts of the pigment paste of section 3. are added with stirring to the resulting mixture. The electrodeposition paint thus obtained is made up to 5000 parts with deionized water. After aging for 5 days at room temperature the paint is deposited on a steel test panel connected as cathode. The deposition voltage here is 300 V and the deposition time 2 min, and the bath temperature is adjusted to 30° C. The deposited paint film is rinsed with deionized water and baked at 165° C. for 20 min. The resulting baked coating films were tested. The test results can be taken from Table 1.

TABLE 1

| Electrodeposition paint | (I) | (II) | (III) |
|---|---|---|---|
| 360 h salt spray mist exposure according to ASTM B 117 | | | |
| Under-rusting in mm | 0.6 | 0.8 | 0.8 |
| Planar rust[1] | 1 | 1 | 1 |
| Edge rust[1] | 1 | 1 | 5 |
| Electrical quality number[2] in % | 97 | 90 | 4 |
| Sand abrasion[3] according to specification no. 4100 of Adam Opel AG in μm$^{-1}$ | 1.2 | 1.5 | 1.0 |

[1] 0 = best value; 5 = worst value
[2] This number is determined by applying a voltage of 50–1000 V to the coated edge and determining the insulating effect with respect to electrical current. The higher the electrical quality number, the higher the insulation effect. The higher the insulation effect, the better the coating of the edge with a film of electrodeposition paint.
[3] The higher the value, the higher the resistance of the paint film to sand abrasion.

We claim:

1. Aqueous electrodeposition coating materials comprising cathodically depositable synthetic resins, and further comprising a reaction product (A) and a polymerization initiator (B) which forms free radicals, wherein the cathodically depositable synthetic resin is different from (A) and the reaction product (A) is prepared by reacting (a) a polyisocyanate or a mixture of polyisocyanates with
   (b) an organic compound which contains both at least one ethylenically unsaturated double bond and at least one active hydrogen atom per molecule, or a mixture of such organic compounds, and
   (c) an organic compound or mixture of compounds which contains both at least one active hydrogen atom and at least one group per molecule selected from the group consisting of tertiary amino groups, ketimine groups, aldimine groups, and mixtures thereof, and optionally,
   (d) an organic compound which is different from (b) and (c) and contains at least one active hydrogen atom per molecule, or a mixture of such organic compounds, in a quantitative ratio such that from 3 to 80 percent of the NCO groups of component (a) are reacted with component (b), from 3 to 80 percent of the NCO groups of component (a) are reacted with component (c) and from 0 to 94 percent of the NCO groups of component (a) are reacted with component (d), and the resulting reaction product containing tertiary and/or primary amino groups is dispersed in water, wherein at least 5 percent of the tertiary and/or primary amino groups contained in the reaction product are neutralized with a Brönsted acid.

2. Electrodeposition coating materials according to claim 1, wherein component (a) is a polyisocyanate or mixture of polyisocyanates which contains on average from 1.1 to 3.0 NCO groups per molecule.

3. Electrodeposition coating materials according to claim 1 wherein component (b) is a derivative of acrylic acid or methacrylic acid, which contains a functionality selected from the group consisting of hydroxyl, amino and mercapto functionalities, and mixtures of such derivatives of acrylic acid or methacrylic acid.

4. Electrodeposition coating materials according to claim 1 wherein component (b) is a hydroxyalkyl ester of acrylic acid or methacrylic acid or a mixture of hydroxyalkyl esters of acrylic acid or methacrylic acid.

5. Electrodeposition coating materials according to claim 1 wherein compound (c) is a compound of the general formula A—R³—X (I) or a mixture of such compounds, in which A represents a group of the general formula R¹R²N— or R¹R²C=N—, R³ represents an alkylene radical having from 1 to 20 carbon atoms, or represents a group of the general formula —R⁴—O—R⁵— and X represents a hydroxyl group, a primary amino group or a group of the general formula —NH—R⁶, where R¹ and R² may be identical or different and each represent a hydrocarbon radical having from 1 to 20 carbon atoms, R⁴ and R⁵ may be identical or different and each represent an alkylene radical having from 1 to 12 carbon atoms, and R⁶ represents a hydrocarbon radical having from 1 to 20 carbon atoms, or represents a group of the general formula —R³—A, where A and R³ have the definition outlined above.

6. Electrodeposition coating materials according to claim 1 wherein components (a), (b), (c) and (d) are reacted with one another in a quantitative ratio such that from 5 to 40 percent of the NCO groups of component (a) are reacted with component (b), from 3 to 15 percent of the NCO groups of component (a) are reacted with component (c) and from 45 to 92 percent of the NCO groups of component (a) are reacted with component (d).

7. Aqueous electrodeposition coating materials according to claim 1 wherein the resulting reaction product is dispersed in water, and at least 5 percent of the tertiary and/or primary amino groups contained in the reaction product are neutralized with a Brönsted acid before the dispersion.

8. Aqueous electrodeposition coating materials according to claim 1 wherein the resulting reaction product is dispersed in water, and at least 5 percent of the tertiary and/or primary amino groups contained in the reaction product are neutralized with a Brönsted acid during the dispersion.

9. Aqueous electrodeposition coating materials according to claim 1 wherein the resulting reaction product is dispersed in water, and at least 5 percent of the tertiary and/or primary amino groups contained in the reaction product are neutralized with a Brönsted acid after the dispersion.

10. The aqueous electrodeposition coating materials according to claim 1 wherein the cathodically depositable synthetic resin is selected from the group consisting of cationic amine modified epoxy resins and mixtures thereof.

11. Method of coating electrically conductive substrates, comprising the steps of (1) immersing the electrically conductive substrate in an aqueous electrodeposition coating material, (2) connecting the substrate as cathode, (3) depositing a film on the substrate by means of a direct current, (4) removing the coated substrate from the electrodeposition coating material, and (5) baking the deposited coating film, wherein in stage (1) of the method an electrodeposition coating material comprising a reaction product (A) and a polymerization initiator (B) which forms free radicals and an electrodeposition resin different from (A), wherein the reaction product (A) is the reaction product of (a) a polyisocyanate or a mixture of polyisocyanates with (b) an organic compound which contains both at least one ethylenically unsaturated double bond and at least one active hydrogen atom per molecule, or a mixture of such organic compounds, and (c) an organic compound or mixture of organic compounds which contains both at least one active hydrogen atom and at least one group per molecule selected from the group consisting of tertiary amino groups, ketimine groups, aldimine groups, and mixtures thereof, and optionally, (d) an organic compound which is different from (b) and (c) and contains at least one active hydrogen atom per molecule, or a mixture of such organic compounds, in a quantitative ratio such that from 3 to 80 percent of the NCO groups of component (a) are reacted with component (b), from 3 to 80 percent of the NCO groups of component (a) are reacted with component (c) and from 0 to 94 percent of the NCO groups of component (a) are reacted with component (d), and the resulting reaction product comprises tertiary and/or primary amino groups, and is dispersed in water, wherein at least 5 percent of the tertiary and/or primary amino groups contained in the reaction product are neutralized with a Brönsted acid.

* * * * *